Dec. 21, 1954  P. M. SAMPATACOS ET AL  2,697,470
SPRING WINDING MACHINE
Filed April 2, 1951  3 Sheets-Sheet 1
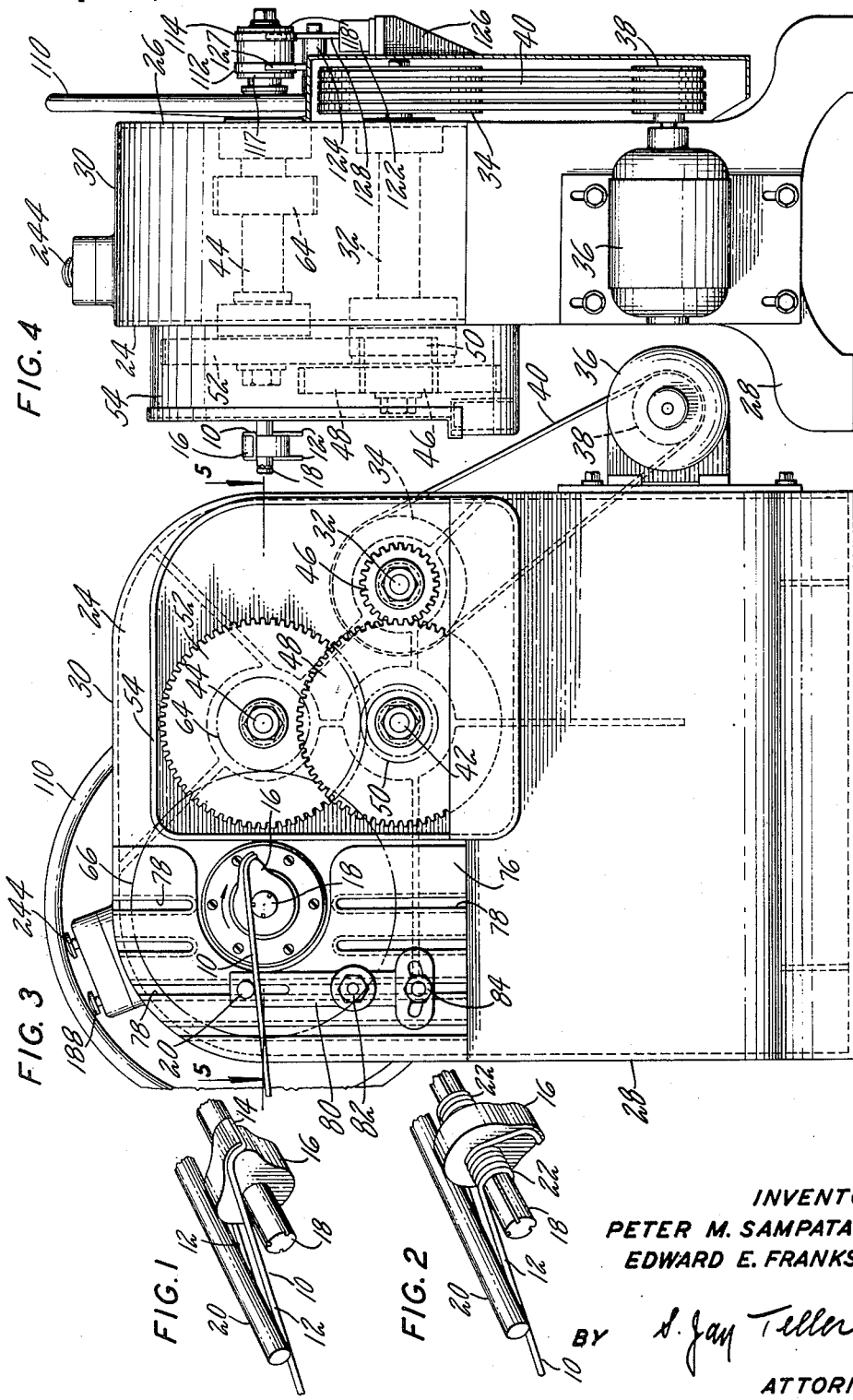
INVENTORS
PETER M. SAMPATACOS
EDWARD E. FRANKS JR.
BY S. Jay Teller
ATTORNEY

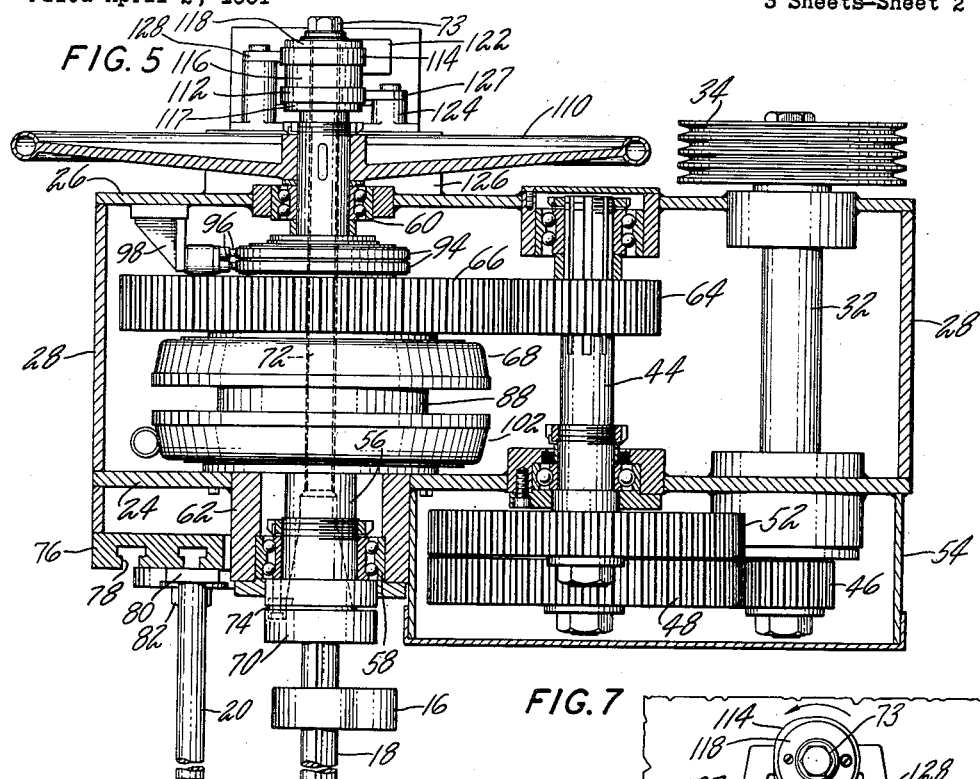
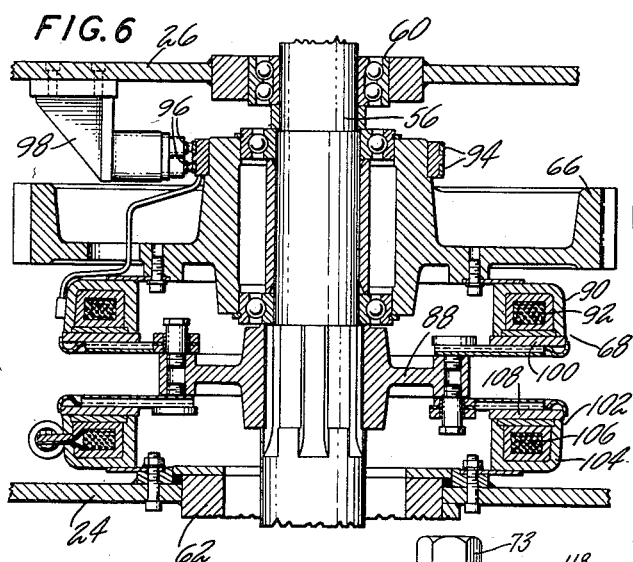
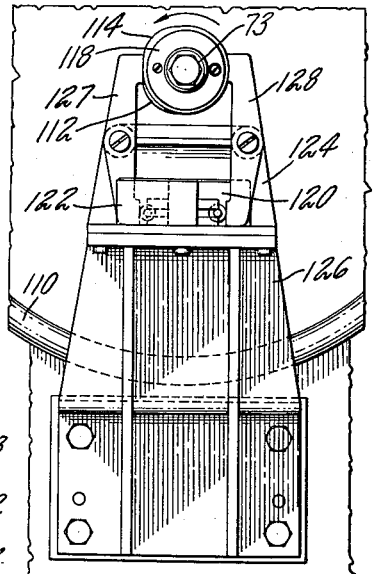

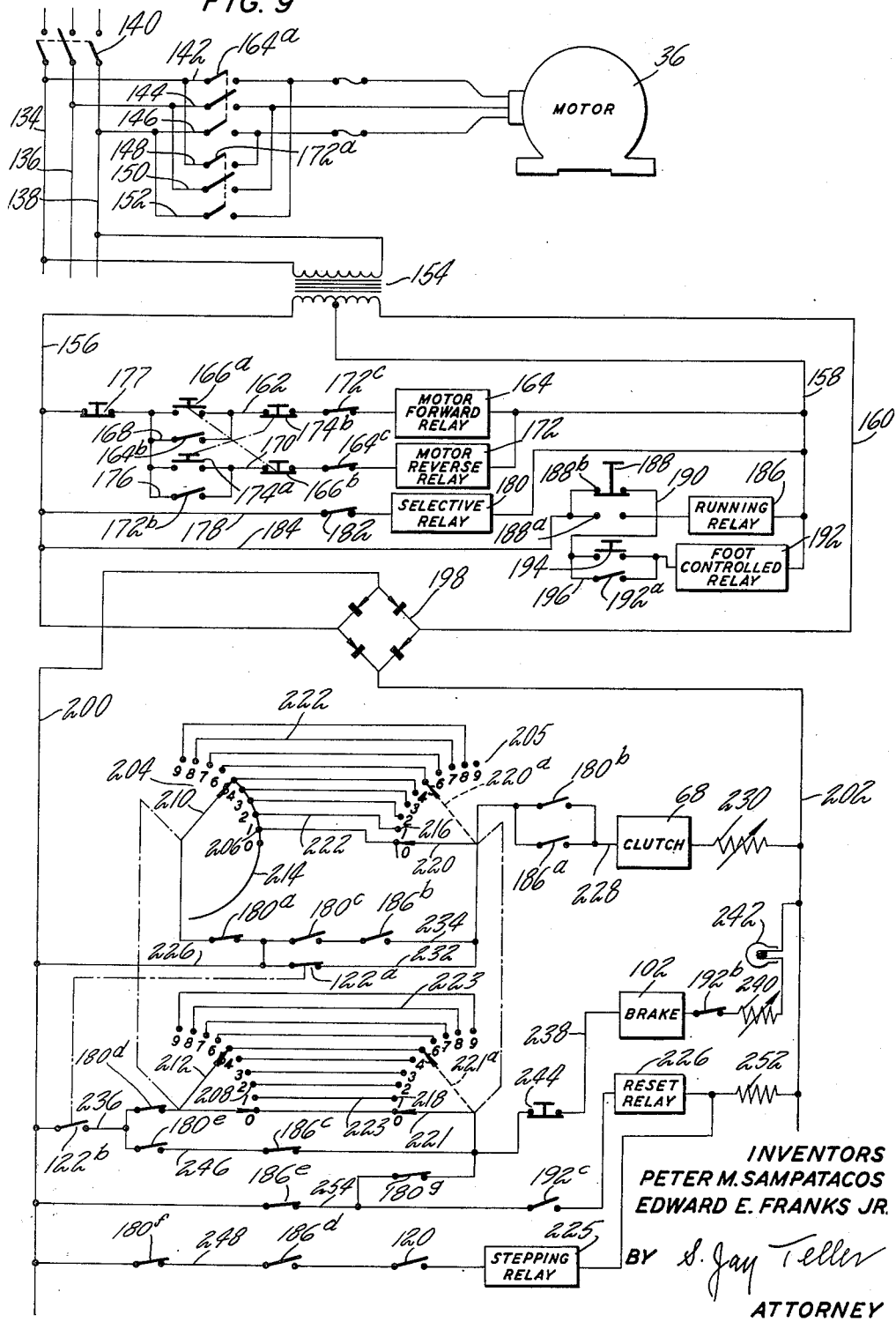

United States Patent Office 2,697,470
Patented Dec. 21, 1954

2,697,470
SPRING WINDING MACHINE

Peter M. Sampatacos, Torrington, and Edward E. Franks, Jr., Litchfield, Conn., assignors to The Torrington Manufacturing Company, Torrington, Conn., a corporation of Connecticut Application April 2, 1951, Serial No. 218,791

19 Claims. (Cl. 153—64)

The invention relates to a machine for coiling or winding lengths of wire to form springs, and it relates more particularly to a machine of the type wherein the lengths of wire are successively connected with a rotatable arbor and are coiled or wound thereon.

One object of the invention is to provide a machine of the type specified having a clutch and a brake, more particularly an electromagnetic clutch and an electromagnetic brake, for driving and stopping the arbor carrying spindle and including means for engaging the clutch to effect rotation of the spindle in the winding direction and also including automatically operable means for disengaging the clutch and engaging the brake to stop the rotation of the spindle after rotation thereof to a predetermined extent.

Another object of the invention is to provide a machine of the type specified having a clutch and a brake, as stated, and having manual controlled means for stopping the rotation of the spindle in the event of an emergency prior to the completion of winding.

Another object of the invention is to provide a machine of the type specified having a clutch and brake and also having means for controlling or retarding a limited amount of reverse rotation of the spindle after the completion of winding, such reverse rotation permitting the spring to unwind to the extent necessary for stabilization.

Another object of the invention is to provide a machine of the type specified having a clutch and brake and also having control or counting means operable for determining the number of whole spring turns to be wound and a second control means dependent for its operation upon the completion of operation of the first control means and then operable for determining an additional fraction of a spring turn to be wound.

Another object of the invention is to provide a machine having the characteristics last above-stated and also having means operable to enable the two control means to operate successively as last above set forth or alternatively operable to prevent the operation of the first control means so that the operation of the second control means can be manually started.

Other objects of the invention are to provide various details of mechanical structure and of electrical arrangement whereby the foregoing more general objects are attained.

Still other objects of the invention will be apparent from the drawings and from the following description and claims.

In the drawings we have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a perspective view showing a spring wire bent to the form in which it is supplied to a machine embodying the invention, this view showing the spring in position for winding by the machine.

Fig. 2 is a perspective view similar to Fig. 1 but showing the spring after it has been wound.

Fig. 3 is a front view of a machine embodying the invention.

Fig. 4 is a right side view of the machine.

Fig. 5 is an enlarged horizontal sectional view taken along the line 5—5 of Fig. 3 but with certain parts shown in plan.

Fig. 6 is an enlarged fragmentary horizontal sectional view similar to a portion of Fig. 5 but showing additional parts in section.

Fig. 7 is a fragmentary rear view.

Fig. 8 is an enlarged fragmentary view partly in section and showing the mounting of the spindle cams.

Fig. 9 is a diagram showing the electrical control for the machine.

A machine embodying the invention may be used for coiling or winding springs of various types. One form of spring that may be wound is shown in Fig. 2 of the drawings, this spring having two similar coils. The spring as shown in Fig. 2 is to be regarded as merely illustrative, the invention not being limited to machines for coiling or winding such a spring. The machine as shown is particularly adapted for the winding or coiling of pieces or lengths of wire which are cut and which may be partly formed before being supplied to the machine. However, the invention is not limited to a machine for the coiling or winding of previously cut and formed lengths of wire.

Fig. 1 shows a wire 10 bent to the shape in which it is supplied to the machine in order to produce the spring shown in Fig. 2. The wire 10 has a generally "hairpin" shape, with two side portions 12, 12 and a transverse connection portion 14. The wire 10 is shown as engaged with a dog 16 having splined engagement with a rotatable arbor 18 carried by the rotatable spindle of the machine. The dog 16 is freely engageable with or disengageable from the arbor 18 by endwise movement and the splining is such that the dog can be engaged in only one position. The side portions 12, 12 of the wire are engaged with a stationary stud 20 to prevent rotation. By the action of the machine the side portions 12, 12 of the wire are coiled or wound on the arbor to produce coils 22, 22 as shown in Fig. 2. The arbor 18 and the dog 16 collectively constitute means carried by the spindle for engaging a wire to effect winding thereof to form a spring.

Machine as shown in Figs. 3 to 7

The machine comprises a main frame for carrying or supporting all of the operative parts other than some of the electrical equipment which may be separately supported as hereinafter explained. The frame of the machine comprises vertical front and rear plates 24 and 26 connected with a base 28. A cover 30 which may be formed of sheet metal connects the front and rear plates at the top and ends thereof and encloses the space between the said plates.

Supported in suitable bearings in the front and rear frame plates is a horizontal main drive shaft 32 to which power is supplied. As shown, a grooved belt pulley 34 is connected with the shaft 32 at the rear end thereof, and a motor 36 is secured to the frame at the right side thereof, said motor carrying a groove belt pulley 38 in register with the pulley 34. Belts 40 extend around said pulleys to transmit power from the motor 36 to the drive shaft 32.

Also supported in suitable bearings in the front and rear are a horizontal idler shaft 42 and a horizontal intermediate drive shaft 44, the shaft 42 being directly below the shaft 44. The shafts 32, 42 and 44 project at the front beyond the front plate 24, and intermeshing gears 46, 48, 50 and 52 are mounted on the said shafts. The gear 46 is mounted on the shaft 32 and it meshes with the gear 48 mounted on the shaft 42. The gear 50 is also mounted on the shaft 42 and it meshes with the gear 52 mounted on the drive shaft 44. Thus the intermediate drive shaft 44 is driven by the main drive shaft 32. The gears 46, 48, 50 and 52 are readily removable and they may be replaced by other gears providing a different speed ratio between said shafts. The gears are preferably enclosed in a housing 54 having a removable cover, the cover being omitted in Fig. 3.

A horizontal spindle 56 is rotatably supported in bearings 58 and 60 carried by the front and rear plates. There is a forwardly projecting supporting bushing 62 for the front bearing 58, said bearing being spaced forwardly from the wall 24. Rigidly secured to the intermediate shaft 44 is a gear 64 which meshes with a gear 66 rotatably mounted on the spindle 56. A clutch 68 is provided by means of which the gear 66 may be operatively connected with or disconnected from the spindle. When the clutch is engaged the spindle is operatively connected with the drive shaft 44 for rotation in the winding direction. When the clutch is disengaged the spindle is free from driving connection with said drive shaft. The spindle may be rotated either in the clockwise direction or in the counterclockwise direction to effect winding, the motor 36 being reversible. For purposes of explanation it will be assumed that the spindle is rotated in the clockwise direction as viewed in Fig. 3.

The spindle 56 projects at the front beyond the front plate 24 and beyond the bushing 62 and it has a tapered opening for receiving a driving member for the arbor 18 which member may be a chuck 70. The chuck 70 is held in place by a threaded draw rod 72 which extends through a central hole in the spindle 56 and has a head 73 at the rear. Preferably there is a block or key 74 at the front end of the spindle which enters and fits a slot in the chuck 70, a positive drive being thus provided for the chuck.

A suitable tool is provided at the front of the machine for engaging the legs 12, 12 of the wire 10 while the wire is being coiled or wound on the arbor 18. The form of the tool may be widely varied, but as shown the tool is merely the before-mentioned stud 20. For supporting the stud 20 or for supporting other tools a vertical plate 76 is provided which is connected with the vertical plate 24 and spaced forwardly therefrom. The plate 76 is provided with an opening for receiving the forward end of the bushing 62. The plate 76 is shown as provided with a plurality of vertical T-slots 78, 78. As shown the stud 20 is carried by a bracket 80 and is adjacent the upper end thereof. The bracket 80 is held in place by bolts 82 and 84 having their heads entered in one of the T-slots 78. The bracket preferably has an arcuate slot for receiving the lower bolt 84, the bracket being thus adjustable about the axis of the upper bolt 82.

The clutch 68 is preferably of the electromagnetic type and it is adapted to be engaged and disengaged by means including electric circuits and switches as hereinafter explained in detail. Any suitable electromagnetic clutch may be used, and the clutch and its associated parts as shown in detail in Fig. 6 are intended to be merely illustrative. A spindle driving and controlling member 88 is rigidly connected with the spindle adjacent the clutch. The clutch includes a rotatable cylindrical member 90 which is rigidly connected with the gear 66 for rotation therewith, said member carrying an annular magnet coil 92. The coil 92 is connected in an electric circuit by means of slip rings 94, 94 and by means of stationary brushes 96, 96 engaging the slip rings, said brushes being carried by a bracket 98 on the rear plate 26. The clutch 68 also includes a rotatable armature 100 which is connected with the disc 88 for rotation in unison with the spindle.

When the clutch magnet coil 92 is energized, the clutch armature 100 is moved longitudinally of the spindle and into frictional engagement with a friction member adjacent the magnet and movable therewith and the spindle 56 is rotated in unison with said magnet and with the gear 66. When the magnet coil 92 is deenergized the armature 100 is released from frictional connection with the said magnet and said gear 66 and magnet are freely rotatable independently of the spindle.

A brake 102 is provided for quickly stopping the rotation of the spindle. When the brake is engaged it serves to prevent rotation of the spindle. When the brake is disengaged the spindle is free for rotation by the clutch 68. The brake 102 is preferably of the electromagnetic type. Any suitable electromagnetic brake may be used, but as shown the brake 102 is similar to the clutch 68. The brake includes a cylindrical member 104 which is nonrotatable and is preferably rigidly connected with the front plate 24, said member carrying an annular magnet coil 106. The brake 102 also includes a rotatable armature 108 which is connected with the disc 88 for rotation in unison therewith.

When the brake magnet coil 106 is energized the brake armature 108 is moved longitudinally of the spindle and into frictional engagement with a nonrotatable friction member adjacent the magnet. The frictional engagement tends to quickly stop rotation of the spindle and to hold the spindle in a fixed rotative position. When the brake magnet coil 106 is de-energized the brake armature 108 is released from frictional connection with the magnet and the spindle is free so that it can be rotated by the clutch 68. The spindle 56 projects at the rear beyond the rear plate 26 and a hand wheel 110 is rigidly connected with the projecting portion.

Also carried by the rearward projecting portion of the spindle are two similar longitudinally spaced cams 112 and 114 having a spacer 116 between them which is keyed to the spindle. The cams are rotatively adjustable with respect to the spacer and the spindle and they can be clamped in their adjusted positions. The cam 112 is clamped by bolts engaging a clamping ring 117, and the cam 114 is clamped by bolts engaging a clamping ring 118.

As shown in Fig. 7, the cams 112 and 114 serve to control two similar switches 120 and 122. The switches are located one behind the other and they are oppositely positioned. The switches 120 and 122 are shown as carried by a bracket 124 which in turn is carried by a bracket 126 secured to the rear plate 26 of the machine. Horizontally pivoted to the bracket 124 is a lever 127 which engages the cam 112 and operates the switch 120. Also horizontally pivoted to the bracket 124 is a lever 128 which engages the cam 114 and operates the switch 122. As shown in the diagram of electrical connections in Fig. 9, the switch 122 comprises two pairs of contacts 122ª and 122ᵇ. For convenience of description the contacts of said pairs will sometimes be referred to as separate switches. Upon each operation the switch 122ª is opened and the switch 122ᵇ is simultaneously closed and thereafter the switch 122ª is closed and the switch 122ᵇ is simultaneously opened.

*Electrical control as shown in Fig. 9*

Fig. 9 shows the various electrical connections for the machine shown in Figs. 3 to 7. It will be understood that some of the electrical units may be mounted on a separate panel rather than on the main frame of the machine.

Main alternating current leads 134, 136 and 138 are provided which are controlled by a main switch 140. The main leads are connected with forward leads 142, 144 and 146 for the motor 36 and said main leads are also connected with reverse leads 148, 150 and 152 for said motor.

The primary coil of a transformer 154 is connected between the main leads 134 and 138. Connected with the secondary coil of the transformer are two leads 156 and 158 having a suitable relatively small potential between them which may be 110 volts. Connected with another portion of the secondary coil of the transformer is a lead 160. The potential between the leads 156 and 160 is greater than that between the leads 156 and 158 and may be 220 volts.

Included in a connection 162 between the leads 156 and 158 is the coil of a forward motor starter relay 164 and an initially open manually operable forward starter switch 166ª. Connected in parallel with the switch 166ª is a shunt 168. Included in another connection 170 between the leads 156 and 158 is the coil of a reverse motor starter relay 172 and an initially open manually operable reverse starter switch 174ª. Connected in parallel with the switch 174ª is a shunt 176. Included in the connection 170 is an initially closed switch 166ᵇ, this being mechanically connected to be opened when the forward starter switch 166ª is closed. Included in the connection 162 is an initially closed switch 174ᵇ, this being mechanically connected to be opened when the reverse starter switch 174ª is closed.

The forward motor leads are controlled by a switch 164ª and the reverse motor leads are controlled by a switch 172ª. Included respectively in the shunts 168 and 176 are initially open switches 164ᵇ and 172ᵇ. Included respectively in the connections 162 and 170 are initially closed switches 172ᶜ and 164ᶜ. The switches 164ª, 164ᵇ and 164ᶜ are mechanically connected with the forward relay 164 so that upon energization of the relay the switches 164ª and 164ᵇ are closed and the switch 164ᶜ is opened. The switches 172ª, 172ᵇ and 172ᶜ are mechanically connected with the reverse relay 172 so that upon energization of the relay the switches 172ª and 172ᵇ are closed and the switch 172ᶜ is opened.

Upon manual closing of the forward starter switch 166ª the forward relay 164 is energized and the switch 166ᵇ is opened. The opening of the switch 166ᵇ prevents any possible energization of the reverse relay 172. The energization of the relay 164 closes the switch 164ª to start the motor in the forward direction and closes the switch 164ᵇ to maintain the circuit through the relay after the starter switch 166ᵃ is opened. At the same time the switch 164ᶜ is opened to prevent any possible energization of the reverse relay after the switch 166ᵇ is closed.

Upon manual closing of the reverse starter switch 174ᵃ the reverse relay 172 is energized and the switch 174ᵇ is opened. The opening of the switch 174ᵇ prevents any possible energization of the forward relay 164. The energization of the relay 172 closes the switch 172ᵃ to start the motor in the reverse direction and closes the switch 172ᵇ to maintain the circuit through the relay after the starter switch 174ᵃ is opened. At the same time the switch 172ᶜ is opened to prevent any possible energization of the forward relay coil after the switch 174ᵇ is closed.

An initially closed motor stop switch 177 is connected in series between the line 156 and the connections 162 and 170. The manual opening of the switch 177 serves to de-energize the relay that has been previously energized, thus restoring all of the other switches to their initial positions and stopping the motor.

Included in a connection 178 between the leads 156 and 158 is the coil of a selective relay 180 and a manually operable control switch 182. The relay is energized upon closing of the switch. The machine can be operated in either of two manners as hereinafter explained. For one manner of operation the switch 182 is closed and for the other manner of operation the switch 182 is open. For purposes of the next following description it will be assumed that the switch is closed and that the relay is energized.

Mechanically connected with the selective relay 180 for operation thereby are switches 180ᵃ, 180ᵇ, 180ᶜ, 180ᵈ, 180ᵉ, 180ᶠ and 180ᵍ. The switches 180ᵃ, 180ᵈ, 180ᶠ and 180ᵍ are closed as shown in Fig. 9 when the relay is energized and are open when the relay is de-energized. The switches 180ᵇ, 180ᶜ and 180ᵉ are open as shown in Fig. 8 when the relay is energized and are closed when the relay is de-energized.

Included in a connection 184 between the leads 156 and 158 is the coil of a running relay 186. A push button starting and running switch is provided, this switch including a push button 188 and having a pair of contacts 188ᵃ and also having a pair of contacts 188ᵇ. The said switch is spring biased to the position shown wherein the contacts 188ᵃ are disconnected and wherein the contacts 188ᵇ are connected, but during operation of the machine the switch is manually held in the position with the contacts 188ᵃ connected and with the contacts 188ᵇ disconnected. For convenience of description the contacts 188ᵃ and 188ᵇ will be sometimes referred to as separate switches. The switch controlled by the button 188 is mounted on the frame of the machine near the left end thereof as shown in Fig. 3 for convenient engagement by the left hand of the operator.

The switch 188ᵃ is connected in series with the coil of the running relay 186 and the switch 188ᵇ is in a by-pass connection 190 in which is included the coil of a foot controlled relay 192. Also included in the connection 190 is an initially open foot controlled switch 194. The switch 194 is mounted on the floor adjacent the left end of the machine in convenient position for engagement by one foot of the operator. Connected in parallel with the switch 194 is a shunt 196.

Mechanically connected with the running relay 186 for operation thereby are switches 186ᵃ, 186ᵇ, 186ᶜ, 186ᵈ and 186ᵉ. The switches 186ᵃ, 186ᵇ and 186ᵈ are open as shown in Fig. 9 when the relay is de-energized and are closed when the relay is energized. The switches 186ᶜ and 186ᵉ are closed as shown in Fig. 9 when the relay is de-energized and are open when the relay is energized.

Mechanically connected with the relay 192 for operation thereby are switches 192ᵃ, 192ᵇ and 192ᶜ. The switches 192ᵃ and 192ᶜ are open as shown in Fig. 9 when the relay is de-energized and are closed when the relay is energized. The switch 192ᵇ is closed as shown in Fig. 9 when the relay is de-energized and is open when the relay is energized. The switch 192ᵃ is included in a shunt 196 which by-passes the switch 194. When the relay 192 is energized with resultant closing of the switch 192ᵃ, said switch serves to maintain the relay energized even though the switch 194 is opened.

Connected between the leads 156 and 160 is a rectifier 198 from which extend leads 200 and 202. The leads 200 and 202 are supplied with direct current at a potential which may be 180 volts.

A duplex selector switch unit 204 and a duplex stepping switch unit 205 are provided which are electrically connected as hereinafter described, said units being of commercially available types. The selector switch unit 204 comprises a series of arcuately located uniformly spaced contacts 206 and a second series of arcuately located and similarly spaced contacts 208. The contacts of at least one of said series are preferably numbered in sequence in the counterclockwise direction beginning with "0." As shown the numbers run to "9." Two pivoted arms 210 and 212 are provided which are mechanically connected for manual adjustment in unison. The arm 210 carries an arcuate contact 214 which during adjustment in the counterclockwise direction successively engages the several contacts 206, remaining in engagement with each engaged contact. The arm 212 during adjustment in the counterclockwise direction successively engages the several contacts 208, 208 individually. The arms 210 and 212 are initially adjusted manually as required and then remain in fixed positions.

The stepping switch unit 205 comprises a series of arcuately located uniformly spaced contacts 216 and a second series of arcuately located similar spaced contacts 218. The contacts of at least one series may be numbered in sequence in the clockwise direction beginning with "0." Two arms 220 and 221 are provided which are mechanically connected for step-by-step movements in unison in the clockwise direction by a relay as hereinafter explained. The arms 220 and 221 upon step-by-step movement engage the contacts 216 and 218 individually. However, the arm 220 is of such width at its contact engaging end that, at each stepping movement, it remains in engagement with each preceding contact until the next following contact is engaged. By means of conductors 222, 222 some of the contacts 206 of the selector switch unit are electrically connected respectively with some of the contacts 216 of the stepping switch unit, but the contact "0" of the series 206 and the contact "9" of the series 216 are unconnected. The contact "1" of the series 206 is connected with the contact "0" of the series 216, and the other contacts are similarly connected as shown. By means of conductors 223, 223 the contacts of the series 208 of the selector switch unit are electrically connected respectively with the contacts of the series 218 of the stepping switch unit.

Included in or associated with the stepping switch unit 205 is stepping relay 225 which upon successive energizations serves to effect step-by-step movements of the arms 220 and 221 in the clockwise direction. The arms thus successively engage the contacts of the 216 series and of the 218 series and they may be moved to positions such as the positions 220ᵃ and 221ᵃ shown in dotted lines. Also included in or associated with said selector switch unit is a reset relay 226 which upon energization serves to reset the arms 220 and 221 in their initial positions as shown in full lines.

The switch arm 210 is connected with the lead 200 by a connection 226 which includes the closed switch 180ᵃ. The switch arm 220 is connected with the lead 202 by a connection 228 which includes the magnet coil of the clutch 68 and a variable resistance 230. Connected in parallel in the connection 228 are the open switch 180ᵇ and the initially open switch 186ᵃ. The clutch portion of the switch units 204 and 205 and the switch 180ᵃ constitute a main connection for the clutch between the connections 226 and 228.

A shunt connection 232 is provided for the clutch 68, this being in parallel with said main connection. In addition there is an alternative connection 234 for the clutch, this being also in parallel with said main connection. The shunt 232 includes the stop switch 122ᵃ forming a part of the spindle cam operated switch 122. The switch 122ᵃ is closed when the spindle cam 114 is positioned as shown in Fig. 7 with its rise out of engagement with the lever 128. The alternative connection 234 includes the open switch 180ᶜ and the initially open switch 186ᵇ.

The switch arm 212 is connected with the lead 200 by a connection 236 which includes the closed switch 180ᵈ and which also includes the stop switch 122ᵇ which forms a part of the said spindle cam operated switch 122.

The switch 122ᵇ is open whenever the switch 122ᵃ is closed. The switch arm 221 is connected with the lead 202 by a connection 238 which includes the magnet coil of the brake 102 and a variable resistance 240. The brake portion of the switch units 204 and 205 and the switch 180ᵈ constitute a main connection for the brake between the connections 236 and 238. The connection 238 preferably also includes a hot wire resistance 242 which may be an incandescent light bulb. In addition, the connection 238 includes the initially closed switch 192ᵇ and it preferably includes an initially closed manually operable release switch 244. The switch 244 is mounted on the frame of the machine adjacent the switch 188 as shown in Fig. 3.

A shunt connection 246 is provided between the connections 236 and 238, this being in parallel with the said main connection. This shunt connection includes the open switch 180ᵉ and the initially closed switch 186ᶜ.

A connection 248 is provided between the leads 200 and 202 and included in this connection is the coil of the beforementioned stepping relay 225 which upon each energization serves to move the switch arms 220 and 221 in the clockwise direction by one step. The connection 248 also includes a fixed resistance 252. In addition to the foregoing the connection 248 includes the closed switch 180ᶠ, the initially open switch 186ᵈ and the contacts of the spindle cam operated switch 120. The switch 120 is open when the spindle cam 112 is positioned as shown in Fig. 7 with its rise out of engagement with the lever 127.

Connected in parallel with the connection 248 is a connection 254 which includes the coil of the beforementioned reset relay 226. The relay 226 serves upon energization to return the switch arms 220 and 221 to their initial positions as shown by full lines after they have been given step-by-step clockwise movements by the relay 225. The connection 254 also includes the initially closed switch 186ᵉ and the initially open switch 192ᶜ. A cross-connection is provided between the connections 246 and 254, this connection including the initially closed switch 180ᵍ.

Operation of machine shown in Figs. 3 to 9

The operator stands at the left end of the machine so that he can conveniently remove the successive completed springs and so that he can put in place successive new wires 10. He can engage the switches 188 and 244 with his left hand and he can also engage the hand wheel 110 with his left hand. He can engage the foot switch 194 with one foot, ordinarily his right foot.

In describing the manner of operation it will be assumed that the spindle is rotated in the clockwise direction to effect winding, the dog 16 being positioned as shown with its hook facing in the clockwise direction. It will also be assumed that the switch 182 is closed. The manner of operation with the switch 182 open will be later described. With the switch 182 closed the relay coil 180 is energized. The switches 180ᵃ, 180ᵈ, 180ᶠ and 180ᵍ are closed and the switches 180ᵇ, 180ᶜ and 180ᵉ are open, all as shown in Fig. 9.

In setting up the machine the cams 112 and 114 are properly adjusted according to the required extent of winding. By way of example, it will be assumed that the completed spring is to have 5¼ turns. The spring will recoil or unwind to a limited extent to effect stabilization, and the unwinding will be assumed to be ½ of a turn. Therefore the extent of initial winding must be 5¾ turns. The arms 210 and 212 of the selector switch are properly adjusted to positions such as those shown in Fig. 9. It will be seen that the arm 210 of the selector switch 204 is so adjusted that the arcuate contact 214 engages contact "5" of the series 206 and that the arm 212 of the said switch engages contact "5" of the series 208. The setting of the arms 210 and 212 represents the number of whole turns of winding.

Upon the completion of winding and after the necessary unwinding, the wire 10 has been coiled or wound to the shape shown in Fig. 2. The spindle is freely rotatable as hereinafter explained. The operator removes the dog 16 from the arbor 18, the wound spring being removed with the dog. To facilitate removal of the spring the spindle may be moved slightly in the counterclockwise direction by means of the hand wheel 110. The spring is separated from the dog and a new wire 10 is engaged with the dog and the dog is re-engaged with the arbor. At the option of the operator, the wire 10 may be engaged with the dog either before or after the dog is re-engaged with the arbor. With the dog and wire in place on the arbor, the operator rotates the spindle in the clockwise direction by means of the hand wheel so that the legs 12, 12 of the wire engage the stud 20 as shown in Figs. 1 and 3.

With the spindle in position as described, the operator presses the switch button 188 to close the switch 188ᵃ. The button is pressed and the switch 188ᵃ is manually held connected during the entire winding operation. By reason of the closing of the switch 188ᵃ the running relay 186 is energized and the switch 186ᵃ is closed. A circuit is thus established through the connection 226, the switch 180ᵃ, the arm 210, the arcuate contact 214, the lowermost conductor 222, the arm 220, the switch 186ᵃ, the magnet coil of the clutch 68 and the variable resistance 230. The energization of the clutch magnet coil starts the rotation of the spindle in the manner previously described. The switches 186ᶜ and 186ᵉ are simultaneously opened, thus preventing the establishment of a circuit through the magnet coil of the brake 102.

Simultaneously with the closing of the switch 186ᵃ and the opening of the switches 186ᶜ and 186ᵉ the switch 186ᵈ is closed and this partly establishes a circuit through the switch 180ᶠ, the switch 186ᵈ, the spindle cam operated switch 120, the stepping relay 225 and the resistance 252. The last said circuit is not completely established as the switch 120 is open when spindle rotation starts, the rise on the spindle cam 112 being spaced from the lever 127 as shown in Fig. 7.

As the spindle rotates in the clockwise direction as viewed in Fig. 3, or in the counterclockwise direction as viewed in Fig. 7, the rise on the cam 112 engages the lever 127 to momentarily close the circuit through the switch 120. The momentary closing of the switch 120 completes the circuit through the stepping relay 225 and the relay thereupon moves the arms 220 and 221 one step in the clockwise direction. The arm 220 then engages the contact "1" of the series 216 and the arm 221 engages the contact "1" of the series 218. As shown, the rise on the cam 212 is so positioned that the spindle rotates approximately ⅞ of a turn before the switch 120 is closed for the first time. The energization of the stepping relay 225 is repeated during each successive rotation of the spindle, the arms 220 and 221 being successively moved and being eventually moved to the positions 220ᵃ and 221ᵃ shown by dotted lines in Fig. 9. In these positions the arm 220 engages the contact "5" of the series 216 and the arm 221 engages the contact "5" of the series 218. The spindle will have been rotated through 4⅞ turns which is within less than a complete turn of the required 5¾ turns. The exact setting of the cam 112 is not critical, but it is essential that it be so set that less than a complete turn will remain after the final movement of the arms 220 and 221.

With the arm 220 in engagement with the contact "5" of the 216 series, there is no longer any connection to the magnet coil of the clutch 68 through any of the conductors 222. However, the circuit through the clutch magnet is still maintained through the closed cam operated stop switch 122ᵃ. This last-mentioned circuit is maintained until the rise on the cam 114 engages the lever 128 to open the switch 122ᵃ. The cam 114 is so positioned that the switch is opened and the circuit is broken after an additional ⅞ of a turn or after 5¾ turns from the starting position. Thereupon the clutch magnet coil is de-energized and the spindle is no longer power driven.

At the beginning of winding, the arm 221 of the stepping switch unit is in engagement with contact "0" of the series 218, but no circuit to the brake magnet coil is established through any of the conductors 223. However, when the arm 221 has been successively moved into engagement with the contact "5" of the series 218, a circuit is partly established or cocked through the open cam operated stop switch 122ᵇ, the closed switch 180ᵈ, the arm 212, the corresponding conductor 223, the arm 221, the closed switch 244, the magnet coil of the brake 102, the switch 192ᵇ, the variable resistance 240 and the hot wire resistance 242. However, the aforesaid circuit is not completely established until the switch 122ᵇ is closed, this occurring simultaneously with the opening of switch 122ᵃ. It will be apparent that the brake circuit is completed simultaneously with the breaking of the clutch circuit. As soon as the circuit through the brake magnet coil is completed, the brake is applied to practically instantaneously stop the rotation of the spindle. The hot wire resistance 242 permits an instantaneous surge of current through the brake magnet coil which enables the brake to act very quickly. As soon as the hot wire resistance is heated, the current through the brake magnet coil is very substantially reduced. In view of the substantially instantaneous stopping of the spindle the rise on the cam 114 remains in engagement with the lever 128, the switch 122 remaining closed with the brake engaged.

The selector switch unit 204 and the stepping switch unit 205 and the parts directly associated therewith constitute an adjustable control or counting means. The control or counting means includes an element such as the cam 112 movable in timed relationship with the rotation of the spindle. The control or counting means also includes an element such as the arms 220 and 221 which are operated to controlling positions after a predetermined or selected extent of spindle rotation or after a predetermined number of spindle turns. The arm 220 is moved to an open circuit position as shown by the dotted line in Fig. 9 and the arm 221 is moved to a closed circuit position as shown by the dotted line in Fig. 9. The portions of the switch unit 204 and 205 in the clutch circuit are sometimes herein referred to as a clutch control switch and the portions of the switch unit 204 and 205 in the brake circuit are sometimes herein referred to as a brake control switch.

The cam operated switch 122ᵃ and 122ᵇ and the parts directly associated therewith constitute a second control means, this second control means being dependent upon the prior movement of said elements of the first control means to their said controlling positions as above described. The second said control means includes an element such as the cam 114 movable in unison with the spindle, and said second control means is operated after the spindle has rotated through an additional predetermined fraction of a turn. Upon operation the second control means serves to substantially simultaneously disengage the clutch and engage the brake so as to stop the spindle.

After winding has been completed and after the spindle has been automatically stopped in the manner previously described, the operator releases the button 188, thus opening the switch 188ᵃ and closing the switch 188ᵇ. The opening of the switch 188ᵃ de-energizes the running relay 186 and causes the switches 186ᵃ, 186ᵇ, 186ᶜ, 186ᵈ and 186ᵉ to move to the positions shown in Fig. 9, the switches 186ᵃ, 186ᵇ and 186ᵈ being open and the switches 186ᶜ and 186ᵉ being closed. The circuits through the closed switches 186ᵉ and 180ᵍ keep the brake 102 temporarily engaged.

The closing of the switch 188ᵇ cocks a circuit through the connection 190 and the foot switch 194. In order to remove the completed spring the operator closes the switch 194 with his foot, thus energizing the relay 192 and closing the switch 192ᵃ so as to maintain the circuit through the relay 192 after the switch 194 has been opened. The energizing of the relay 192 also opens the switch 192ᵇ thus releasing the brake. Thereupon the spring unwinds to a limited extent causing the spindle to rotate in the reverse direction. The extent of unwinding has been assumed to be ½ of a turn. The reverse rotation of the spindle during unwinding is retarded by the operator who places his hand on the hand wheel 110. The hand wheel 110 constitutes means for retarding the rotation of the spindle in the unwinding direction under the influence of the spring to permit spring stabilization. After unwinding the operator removes the completed spring as previously described.

The energizing of the relay 192 also closes the switch 192ᶜ and establishes a circuit through the reset relay 226. The relay 226 thereupon returns the stepping switch arms 220 and 221 to their initial positions so that they are ready for the next following cycle.

It will be observed that the energization of the foot controlled relay 192 is maintained by the switch 192ᵃ. This keeps the switch 192ᵇ open and prevents engagement of the brake, the spindle being free for adjustment by the handwheel 110 as previously described. This condition prevails until the switch 188ᵇ is opened by the pressing of the button 188 at the start of the next cycle. Then the relay 192 is de-energized and the switch 192ᵇ is closed. However, the switch 180ᵉ is then open and the arm 221 is in its initial non-connecting position, thus preventing the establishing of a circuit through the brake magnet coil.

It will be understood that the button 188 is continuously pressed manually during the winding operation. If the button 188 is released at any time, the relay 186 is de-energized, thus opening the switch 186ᵃ to de-energize the clutch magnet coil. At the same time the switch 186ᵉ is closed to energize the brake magnet coil, the circuit to the brake magnet coil extending through the closed switch 180ᵍ. The spindle is thereupon practically instantaneously stopped.

Ordinarily the winding is interrupted by the releasing of the button 188 only when some emergency condition is encountered, as for instance when the operator observes that the spring is not being properly wound. With the spindle stopped and with an incomplete spring on the arbor it is necessary to release the brake in order that the spindle may be rotated to permit the removal of the incomplete spring. This is done by pressing the button of the switch 244 to temporarily break the circuit through the brake magnet coil. After the incomplete spring has been removed, the foot switch 194 is pressed to operate the relay 226 and thus restore the stepping switch unit to the starting position.

It is sometimes preferable not to use the automatic mechanism which counts the number of turns, such counting being then done by the operator. The operator does not actually count the turns, but by observing the remaining lengths of the wire legs 12, 12 he determines when a sufficient number of turns have been wound.

When the automatic counting mechanism is not to be used, the switch 182 is moved to its open position. With the switch 182 open the selective relay 180 is not energized. The switches 180ᵃ, 180ᵈ, 180ᶠ and 180ᵍ are open and the switches 180ᵇ, 180ᶜ and 180ᵉ are closed. The opening of the switch 180ᵃ opens the main connection for the clutch, and the opening of the switch 180ᵈ opens the main connection for the brake. Thus the clutch and brake portions of the switch unit 204 s caused to be ineffective. The closing of the switch 180ᶜ partly closes the alternative clutch connection 234 and the closing of the switch 180ᵉ partly closes the shunt brake connection 246.

The wire 10 is put in place as previously described, and the button 188 is pressed to close the switch 188ᵃ and energize the running relay 186. A circuit through the clutch magnet coil is established independently of the selector and stepping switch units, this circuit including the connection 226, the closed switches 180ᶜ and 186ᵇ in the alternative clutch connection 234, the parallelly connected closed switches 180ᵇ and 186ᵃ, the magnet coil of the clutch 68 and the resistance 230. The spindle is then rotated as previously described. The switch 186ᶜ in the shunt brake connection 246 is simultaneously opened, thus preventing the establishment of a circuit through the magnet coil of the brake 102.

When the operator determines by observing the remaining lengths of the legs 12, 12 of the wire that the required number of full turns has been wound, he releases the button 188 to open the switch 188ᵃ and to de-energize the running relay 186. This opens the switches 186ᵇ and 186ᵃ, the opening of the switch 186ᵇ serving to break the alternative connection 234 to the magnet coil of the clutch. However, the circuit through the clutch magnet is still maintained through the closed switch 180ᵇ and the shunt connection 232 which includes the cam operated switch 122ᵃ. The simultaneous closing of the switch 186ᶜ partly closes the brake shunt connection 246 but does not entirely close it as the cam operated switch 122ᵇ is still open. The shunt clutch connection 232 remains closed and the shunt brake connection 246 remains open until the rise on the cam 114 engages the lever 128 to open the circuit at the switch 122ᵃ and to simultaneously close the circuit at the switch 122ᵇ. Thus the spindle is stopped after an additional fraction of a turn as previously explained.

The de-energizing of the relay 186 also closes the switch 186ᵉ thus cocking a circuit through the brake magnet coil 102 which circuit is independent of the selector and stepping switch units. This circuit is then closed in the manner already described by the closing of the cam operated switch 122ᵇ when the required additional fraction of a turn has been completed. By means of the foot operated switch 194 the brake can be released in the manner previously described.

As thus far described, it has been assumed that the spindle is to be operated in the clockwise direction to effect winding. To effect winding in the counterclockwise direction the direction of rotation of the motor 36 is reversed so that the spindle will rotate in the counterclockwise direction. The dog 16, or an alternative similar dog, is positioned with its hook facing in the counterclockwise direction. The wire 10 is engaged with the dog with the legs 12, 12 positioned below the arbor 18 instead of above it. The stud 20 is so positioned that the legs 12, 12 of the wire are above the stud instead of below it. Except as is last above-stated, the manner of operation is exactly the same as previously described.

The invention claimed is:

1. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, means dependent upon spindle rotation for effecting movement of the first control element so that it is moved in a predetermined stationary controlling position upon the completion of a predetermined spindle rotation which is at least one complete turn, means dependent upon spindle rotation and structurally separate from the last said means for effecting subsequent independent movement of the second control element to a predetermined controlling position upon the completion of an immediately following additional predetermined spindle rotation which is less than a complete turn, and means dependent upon the location of the first control element in its said controlling position and immediately operable upon the movement of the second control element to its said controlling position for stopping spindle rotation and wire winding after rotation of the spindle to an extent which is equal to the sum of the first said predetermined spindle rotation and the said additional predetermined spindle rotation.

2. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, means dependent upon spindle rotation and repetitively operable during successive spindle turns for effecting successive step-by-step movements of the first control element so that it is in a predetermined controlling position upon the completion of a predetermined spindle rotation which is at least two complete turns, means dependent upon spindle rotation and operable separately from the last said means for effecting subsequent independent movement of the second control element to a predetermined controlling position upon the completion of an immediately following additional predetermined spindle rotation which is less than a complete turn, and means dependent upon the location of the first control element in its said controlling position and immediately operable upon the movement of the second control element to its said controlling position for stopping spindle rotation and wire winding after rotation of the spindle to an extent which is equal to the sum of the first said predetermined spindle rotation and the said additional predetermined spindle rotation.

3. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, means including a cam rotatable with the spindle and at the same speed for effecting movement of the first control element so that it is in a predetermined controlling position upon the completion of a predetermined spindle rotation which is at least one complete turn, means including a second cam also rotatable with the spindle and at the same speed for effecting subsequent independent movement of the second control element to a predetermined controlling position upon the completion of an immediately following additional predetermined spindle rotation which is less than a complete turn, and means dependent upon the location of the first control element in its said controlling position and immediately operable upon the movement of the second control element to its said controlling position for stopping spindle rotation and wire winding after rotation of the spindle to an extent which is equal to the sum of the first said predetermined spindle rotation and the said additional predetermined spindle rotation.

4. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, means including a cam rotatable with the spindle and at the same speed for effecting movement of the first control element so that it is in a predetermined controlling position upon the completion of a predetermined spindle rotation which is at least one complete turn, means including a second cam also rotatable with the spindle and at the same speed for effecting subsequent independent movement of the second control element to a predetermined controlling position upon the completion of an immediately following additional predetermined spindle rotation which is less than a complete turn, means for connecting the said second cam with the spindle in any one of a plurality of angularly different positions with respect to the spindle and with respect to the first cam so that the extent of the said additional predetermined spindle rotation may be varied, and means dependent upon the location of the first control element in its said controlling position and immediately operable upon the movement of the second control element to its said controlling position for stopping spindle rotation and wire winding after rotation of the spindle to an extent which is equal to the sum of the first said predetermined spindle rotation and the said additional predetermined spindle rotation.

5. A spring winding machine comprising in combination, a rotatable spindle having a predetermined starting position, means connected with the spindle for rotation therewith and constructed for engaging a wire to effect winding thereof upon spindle rotation, a power actuated drive shaft, an electromagnetic clutch for connecting the spindle with the drive shaft for rotation in the winding direction, an electromagnetic brake for stopping rotation of the spindle, an electrical circuit for the clutch including two parallel main and shunt connections, an electrical circuit for the brake, means for closing the clutch circuit to start rotation of the spindle in the said winding direction from its starting position so as to effect winding of the wire to form a spring, an initially closed control switch in the main clutch connection, an initially open control switch in the brake circuit, means connected with the spindle and operable in timed relationship with the spindle for simultaneously opening the said clutch control switch and closing the said brake control switch after the spindle has rotated to a predetermined substantial extent, a normally closed first stop switch in the shunt clutch connection, a normally open second stop switch in the brake connection, and means connected with the spindle for operating the said stop switches to open the first stop switch to simultaneously close the second stop switch during each turn of the spindle, the first stop switch when first opened after the opening of the clutch control switch serving to open the circuit through the clutch and the second stop switch when first closed after the closing of the brake control switch serving to close the circuit through the brake whereby the said stop switches cooperate to stop the rotation of the spindle and the winding of the wire.

6. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, means dependent upon spindle rotation and repetitively operable during successive spindle turns for effecting successive step-by-step movements of the first control element so that it is moved successively to a plurality of predetermined optionally effective controlling positions, means adjustable to cause any selected one of the last said controlling positions to be the effective controlling position, means dependent upon spindle rotation and operable during successive turns for repetitively effecting independent movements of the second control element to and from a predetermined controlling position which means serves to complete each movement of the second control element to its said controlling position at the end of a predetermined extent of spindle rotation following the movement of the first control element to its corresponding controlling position, and means dependent upon the location of the first control element in its selected effective controlling position and immediately operable upon next following movement of the second control element to its said controlling position for stopping spindle rotation and wire winding.

7. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, a cam rotatable with the spindle and at the same speed, means repetitively operable by the cam during successive rotations thereof for effecting successive step-by-step movements of the first control element so that it is moved successively to a plurality of predetermined optionally effective controlling positions, means adjustable to cause any selected one of the last said controlling positions to be the effective controlling position, a second cam also rotatable with the spindle and at the same speed, means operable by the second cam during successive rotations thereof for repetitively effecting independent movements of the second control element to and from a predetermined controlling position which means serves to complete each movement of the second control element to its said controlling position at the end of a predetermined extent of spindle rotation following the movement of the first control element to its corresponding controlling position, and means dependent upon the location of the first control element in its selected effective controlling position and immediately operable upon next following movement of the second control element to its said controlling position for stopping spindle rotation and wire winding.

8. A spring winding machine comprising in combination, a rotatable spindle having a predetermined starting position, means connected with the spindle for rotation therewith and constructed for engaging a wire to effect winding thereof upon rotation of the spindle in one direction, means for rotating the spindle in the said direction from its said starting position and for thus winding the wire to form a spring, separately movable first and second control elements, a cam rotatable with the spindle and at the same speed, means repetitively operable by the cam during successive rotations thereof for effecting successive step-by-step movements of the first control element so that it is moved successively to a plurality of predetermined optionally effective controlling positions, means adjustable to cause any selected one of the last said controlling positions to be the effective controlling position, a second cam also rotatable with the spindle and at the same speed, means operable by the second cam during successive rotations thereof for repetitively effecting independent movements of the second control element to and from a predetermined controlling position which means serves to complete each movement of the second control element to its said controlling position at the end of a predetermined extent of spindle rotation following the movement of the first control element to its corresponding controlling position, means for connecting the said second cam with the spindle in any one of a plurality of angularly different positions with respect to the spindle and with respect to the first cam so the said predetermined extent of spindle rotation may be varied, and means dependent upon the location of the first control element in its selected effective controlling position and immediately operable upon next following movement of the second control element to its said controlling position for stopping spindle rotation and wire winding.

9. A spring winding machine comprising in combination, a rotatable spindle having a predetermined starting position, means connected with the spindle for rotation therewith and constructed for engaging a wire to effect winding thereof upon spindle rotation, a power actuated drive shaft, an electro-magnetic clutch for connecting the spindle with the drive shaft for rotation in the winding direction, an electromagnetic brake for stopping rotation of the spindle, an electrical circuit for the clutch, an electrical circuit for the brake, means for closing the clutch circuit to start rotation of the spindle in the said winding direction from its starting position so as to effect winding of the wire to form a spring, an initially closed control switch in the clutch circuit which switch has an element movable to a controlling open circuit position, an initially open control switch in the brake circuit which switch has an element movable to a controlling closed circuit position, means connected with the spindle and operable for moving the said elements of both of the said control switches and serving upon the completion of a selected plural number of turns to move the said elements simultaneously and in unison to their respective open circuit and closed circuit positions, and means dependent upon the movement of the said elements to their last said positions for opening the circuit through the clutch and for closing the circuit through the brake and for thereby stopping the rotation of the spindle and the winding of the wire.

10. A spring winding machine comprising in combination, a rotatable spindle having a predetermined starting position, means connected with the spindle for rotation therewith and constructed for engaging a wire to effect winding thereof upon spindle rotation, a power actuated drive shaft, an electromagnetic clutch for connecting the spindle with the drive shaft for rotation in the winding direction, an electromagnetic brake for stopping rotation of the spindle, an electrical circuit for the clutch, an electrical circuit for the brake, means for closing the clutch circuit to start rotation of the spindle in the said winding direction from its starting position so as to effect winding of the wire to form a spring, an initially closed control switch in the clutch circuit which switch has an element movable to a controlling open circuit position, an initially open control switch in the brake circuit which switch has an element movable to a controlling closed circuit position, means connected with the spindle and operable upon the completion of a selected plural number of spindle turns for moving the said elements of both of the said control switches simultaneously and in unison to their respective open circuit and closed circuit positions, and means dependent upon the movement of the said elements to their last said positions and operable after an immediately following additional fraction of a spindle turn for opening the circuit through the clutch and for closing the circuit through the brake and for thereby stopping the rotation of the spindle and the winding of the wire.

11. A spring winding machine comprising in combination, a rotatable spindle having a predetermined starting position, means connected with the spindle for rotation therewith and constructed for engaging a wire to effect winding thereof upon spindle rotation, a power actuated drive shaft, an electromagnetic clutch for connecting the spindle with the drive shaft for rotation in the winding direction, an electromagnetic brake for stopping rotation of the spindle, an electrical circuit for the clutch, an electrical circuit for the brake, means for closing the clutch circuit to start rotation of the spindle in the said winding direction from its starting position so as to effect winding of the wire to form a spring, an initially closed control switch in the clutch circuit which switch has an element movable to a controlling open circuit position, an initially open control switch in the brake circuit which switch has an element movable to a controlling closed circuit position, means connected with the spindle and operable upon each turn thereof for simultaneously moving the said elements of both of the said control switches and serving upon the completion of a selected plural number of turns to move the said elements to their respective open circuits and closed circuit positions, and means dependent upon the movement of the said elements to their last said positions and operable after an immediately following adidtional fraction of a spindle turn for opening the circuit through the clutch and for closing the circuit through the brake and for thereby stopping the rotation of the spindle and the winding of the wire.

12. A spring winding machine comprising in combination, a rotatable spindle adapted to carry means for engaging a wire to effect winding thereof, a power actuated drive shaft, an electromagnetic clutch for connecting the spindle with the drive shaft, an electromagnetic brake for stopping rotation of the spindle, an electrical circuit for the clutch including parallel main and shunt connections, an electrical circuit for the brake including two parallel main and shunt connections, means for closing the clutch circuit to start rotation of the spindle, an initially closed control switch in the main clutch connection which switch has an element movable to a controlling open circuit position, an initially open control switch in the main brake connection which switch has an element movable to a controlling closed circuit position, means operable upon the completion of a selected number of spindle turns for moving the said elements of the said control switches to their respective open circuit and closed circuit positions, a normally closed stop switch in the shunt clutch connection, a normally open stop switch in the shunt brake connection, and means for simultaneously operating the said stop switches to open one of them and to close the other during each spindle rotation, the first stop switch when first opened after the movement of the control switch elements to their controlling positions serving to open the circuit through the clutch and the second stop switch when first closed after the said movement of the control elements serving to close the circuit through the brake and the said stop switches cooperating to stop the spindle.

13. A spring winding machine as set forth in claim 12, wherein the control switch in the main clutch connection includes an element movable successively to different closed circuit positions and then to a controlling open circuit position, wherein the control switch in the main brake connection includes an element connected for movement in unison with the said element of the first said control switch and movable successively to different open circuit positions and then to a controlling closed circuit position, the said element of the second said control switch being movable to its closed circuit position simultaneously with the movement of the said element of the first control switch to its open circuit position, and wherein a relay is provided for successively moving the said switch elements, the said relay being actuated upon each turn of the spindle.

14. A spring winding machine as set forth in claim 13, wherein there are two cams on the spindle, wherein a switch is provided for operation by one cam upon each turn of the spindle for actuating the said relay, and wherein the other cam operates the two stop switches after a predetermined fraction of a turn following the movement of the said elements of the control switches by the said relay to their said controlling open circuit and closed circuit positions.

15. A spring winding machine as set forth in claim 13, wherein a relay is provided for returning the said elements of the control switches to their initial positions, wherein a switch is provided for energizing the last said relay to effect the reset of the said elements to their initial positions, wherein a switch is provided for opening the brake circuit to disengage the brake, the said switch being additional to the said brake control switch and the said brake stop switch, and wherein there is a manually operable means for simultaneously closing the first said switch and opening the second said switch.

16. A spring winding machine comprising in combination, a rotatable spindle having a predetermined starting position, means connected with the spindle for rotation therewith and constructed for engaging a wire to effect winding thereof upon spindle rotation, a power actuated drive shaft, an electromagnetic clutch for connecting the spindle with the drive shaft for rotation in the winding direction, an electromagnetic brake for stopping rotation of the spindle, an electrical circuit for the clutch, an electrical circuit for the brake, an initially closed control switch in the clutch circuit which switch has an element movable to a controlling open circuit position, an initially open control switch in the brake circuit which switch has an element movable to a controlling closed circuit position, means connected with the spindle and operable upon the completion of a selected plural number of spindle turns for moving the said elements of both of the control switches simultaneously and in unison to their respective open circuit and closed circuit positions, means dependent upon the movement of the said elements to their last said positions for opening the circuit through the clutch and for closing the circuit through the brake and for thereby stopping the rotation of the spindle and the winding of the wire, two switches connected respectively in series with the clutch and with the brake which switches are additional to the said first and second control switches, and manually controlled means for operating the two said additional switches to simultaneously open one and close the other, the said means when manually engaged serving to maintain the clutch connected switch closed and to maintain the brake connected switch open for rotation of the spindle and the said means being biased so that upon manual disengagement it opens the clutch connected switch to disengage the clutch and closes the brake connected switch to engage the brake for stopping the spindle.

17. A spring winding machine as set forth in claim 16, wherein a circuit is provided which is disconnected when the last said means is manually engaged and connected when the said means is disengaged, wherein there is a normally open manually closable switch in the said circuit, and wherein means is provided which is operable upon manually closing of the last said switch and which thereupon serves to open the brake circuit to disengage the brake.

18. A spring winding machine comprising in combination, a rotatable spindle having a predetermined starting position, means connected with the spindle for rotation therewith and constructed for engaging a wire to effect winding thereof upon spindle rotation, a power actuated drive shaft, an electromagnetic clutch for connecting the spindle with the drive shaft for rotation in the winding direction, two parallel main and alternative electrical connections for energizing the clutch, an electromagnetic brake for stopping rotation of the spindle, two parallel main and shunt electrical circuits for energizing the brake, two normally closed switches included respectively in the main clutch connection and in the main brake connection, two normally open switches included respectively in the alternative clutch connection and in the shunt brake connection, manually operable means for simultaneously opening the said normally closed switches and closing the said normally open switches, control switches included respectively in the main clutch and brake connections and having elements automatically operable to controlling positions after the spindle has been rotated to a predetermined extent which switches when in the said controlling positions serve to cause the opening of the main clutch connection and the simultaneous closing of the main brake connection to stop the rotation of the spindle and the winding of the wire, the said switches being ineffective when the said normally closed switches are open, and manually controlled means for opening the alternative clutch connection and simultaneously closing the shunt brake connection which means thereby serves independently of the said controlling switches to stop the rotation of the spindle and the winding of the wire when the said normally open switches are closed.

19. A spring winding machine comprising in combination, a rotatable spindle adapted to carry means for engaging a wire to effect winding thereof, a power actuated drive shaft, an electromagnetic clutch for connecting the spindle with the drive shaft, three parallel main and alternative and shunt electrical connections for energizing the clutch, an electromagnetic brake for stopping rotation of the spindle, two parallel main and shunt electrical circuits for energizing the brake, normally closed switches included respectively in the main clutch connection and in the main brake connection, two normally open switches included respectively in the alternative clutch connection and in the shunt brake connection, two manually operable means for simultaneously opening the said normally closed switches and closing the said normally open switches, control switches included respectively in the main clutch and brake connections and having elements automatically operable to controlling positions after the spindle has been rotated to a predetermined extent, manually operable means for opening the alternative clutch connection and for simultaneously partly closing the shunt brake connection, a normally closed stop switch in the shunt clutch connection, a normally open stop switch in the brake shunt connection, and means for simultaneously operating the said stop switches to open one and close the other during each turn of the spindle, the first said stop switch when first opened after the opening of the clutch control switch or after the opening of the alternative clutch connection serving to open the circuit through the clutch and the second said stop switch when first closed after the closing of the brake control switch or after the partial closing of the shunt brake connection serving to close the circuit through the brake and the said stop switches cooperating to stop the spindle.

References Cited in the file of this patent

UNITED STATES PATENTS

| Number | Name | Date |
|---|---|---|
| 1,227,659 | Quackenbush | May 29, 1917 |
| 1,314,909 | Sleeper | Sept. 2, 1919 |
| 1,368,297 | Sleeper | Feb. 15, 1921 |
| 1,579,247 | Rohlfing | Apr. 6, 1926 |
| 1,673,185 | Des Combes | June 12, 1928 |
| 1,702,475 | Jahnig | Feb. 19, 1929 |
| 1,862,267 | Honig | June 7, 1932 |
| 1,884,184 | Pearson | Oct. 25, 1932 |
| 1,993,413 | Mellon | Mar. 5, 1935 |
| 2,018,720 | Hodgson | Oct. 27, 1935 |
| 2,030,988 | Hofstetter | Feb. 18, 1936 |
| 2,034,708 | Browne | Mar. 24, 1936 |
| 2,122,468 | Hill | July 5, 1938 |
| 2,122,485 | Nelson | July 5, 1938 |
| 2,317,290 | McIlvried | Apr. 20, 1943 |
| 2,373,427 | Stickney | Apr. 10, 1945 |
| 2,467,422 | Bruene | Apr. 19, 1949 |
| 2,513,916 | Carlson | July 4, 1950 |
| 2,571,243 | Hooker | Oct. 16, 1951 |
| 2,600,667 | Mason | June 17, 1952 |
| 2,605,973 | Roane | Aug. 5, 1952 |

FOREIGN PATENTS

| Number | Country | Date |
|---|---|---|
| 260,205 | Great Britain | Oct. 28, 1926 |